(12) United States Patent
Kelner et al.

(10) Patent No.: US 11,960,397 B2
(45) Date of Patent: Apr. 16, 2024

(54) DATA MAPPING COMPARISON FOR IMPROVED SYNCHRONIZATION IN DATA STORAGE DEVICES

(71) Applicant: Western Digital Technologies, Inc., San Jose, CA (US)

(72) Inventors: Vered Kelner, Gan Haim (IL); Marina Frid, Jerusalem (IL); Igor Genshaft, Bat Yam (IL)

(73) Assignee: Western Digital Technologies, Inc., San Jose, CA (US)

( * ) Notice: Subject to any disclaimer, the term of this patent is extended or adjusted under 35 U.S.C. 154(b) by 71 days.

(21) Appl. No.: 17/842,563

(22) Filed: Jun. 16, 2022

(65) Prior Publication Data

US 2023/0409475 A1    Dec. 21, 2023

(51) Int. Cl.
*G06F 12/02* (2006.01)
(52) U.S. Cl.
CPC ...... *G06F 12/0292* (2013.01); *G06F 12/0246* (2013.01); *G06F 2212/1008* (2013.01)
(58) Field of Classification Search
CPC ............. G06F 12/0292; G06F 12/0246; G06F 2212/1008
See application file for complete search history.

(56) References Cited

U.S. PATENT DOCUMENTS

| | | | | |
|---|---|---|---|---|
| 4,365,332 A * | 12/1982 | Rice | .................... | G06F 11/1008 714/824 |
| 8,954,694 B2 | 2/2015 | Tomlin et al. | | |
| 9,146,857 B2 | 9/2015 | Nan | | |
| 2001/0052062 A1* | 12/2001 | Lipovski | ................ | G11C 7/065 712/32 |
| 2006/0047920 A1* | 3/2006 | Moore | ................ | G06F 12/0238 711/E12.008 |
| 2009/0150744 A1 | 6/2009 | Flynn et al. | | |
| 2009/0158119 A1* | 6/2009 | Bhattad | .................. | H04L 1/0063 708/316 |
| 2016/0211024 A1* | 7/2016 | Durgam | .................. | G11C 16/08 |
| 2017/0255512 A1* | 9/2017 | Zamir | .................. | H03M 13/618 |
| 2017/0269992 A1 | 9/2017 | Bandic et al. | | |
| 2018/0113616 A1* | 4/2018 | Tanaka | .................... | G06F 3/061 |
| 2019/0227867 A1 | 7/2019 | Ellur | | |

(Continued)

FOREIGN PATENT DOCUMENTS

CN   112463650 A   3/2021

*Primary Examiner* — Tasnima Matin
(74) *Attorney, Agent, or Firm* — PATTERSON + SHERIDAN, LLP

(57) ABSTRACT

A data storage device includes a memory device and a controller coupled to the memory device. The controller is configured to generate a first mapping portion and a second mapping portion, where the first mapping portion and the second mapping portion correspond to a same data set, and where the first mapping portion and the second mapping portion includes one or more parity bits, receive an update for the same data set, update the first mapping portion and the second mapping portion based on the update, where the second mapping portion is updated non-concurrently to updating the first mapping portion, and where the updating includes flipping a parity bit of the one or more parity bits, and determine whether the one or more parity bits of the first mapping portion matches the one or more parity bits of the second mapping portion.

20 Claims, 3 Drawing Sheets

(56) References Cited

U.S. PATENT DOCUMENTS

| | | | |
|---|---|---|---|
| 2020/0210282 A1* | 7/2020 | Cariello | G06F 11/108 |
| 2020/0264984 A1 | 8/2020 | Adams et al. | |
| 2021/0294692 A1* | 9/2021 | Chen | G06F 9/30189 |
| 2021/0349830 A1 | 11/2021 | Balluchi et al. | |
| 2021/0373993 A1* | 12/2021 | Sharon | G11C 16/0483 |
| 2023/0153235 A1* | 5/2023 | Muthiah | G06F 12/0246 |
| | | | 711/154 |

* cited by examiner

DATA MAPPING COMPARISON FOR IMPROVED SYNCHRONIZATION IN DATA STORAGE DEVICES

BACKGROUND OF THE DISCLOSURE

Field of the Disclosure

Embodiments of the present disclosure generally relate to data storage devices, such as solid state drives (SSDs), and, more specifically, improving consistency of flash translation layer (FTL) address mapping in large capacity data storage devices.

Description of the Related Art

Large capacity data storage devices may utilize logical block addresses (LBAs), virtual block addresses (VBAs), and physical block addresses (PBAs) larger than about 32 bits for addressing data in a memory device of the data storage device having a size greater than about 4 terabytes (TBs). When the address is larger than 32 bits, the address may be split between two registers (i.e., mapping tables) having 32 bits each, which may require additional central processing unit (CPU operations to update or translate a flash translation layer (FTL) mapping for each portion of the address. For example, two CPUs may update or translate the flash translation layer (FTL) mapping for each portion of the address.

Because more than one CPU is utilized in the operation of data storage device (e.g., a plurality of CPUs are present in a controller of the data storage device), an inconsistency may occur, where the address mapping may not be synchronized between registers (i.e., mapping tables). For example, if one CPU performs an FTL mapping update due to a host device write operation or a relocation write operation and another CPU performs a translation of the same address as the host device write operation or the relocation write operation, the mapping tables may not be synchronized. In other words, the data of one mapping table is reflected as being updated and the data of the other mapping table is reflected as having outdated data (i.e., data prior to the updating). Thus, the registers mapping a same data set are not synchronized.

Therefore, there is a need in the art to improve synchronization and consistency of mapping tables for large capacity data storage devices.

SUMMARY OF THE DISCLOSURE

The present disclosure generally relates to data storage devices, such as solid state drives (SSDs), and, more specifically, improving consistency of flash translation layer (FTL) address mapping in large capacity data storage devices. A data storage device includes a memory device and a controller coupled to the memory device. The controller is configured to generate a first mapping portion and a second mapping portion, where the first mapping portion and the second mapping portion correspond to a same data set, and where the first mapping portion and the second mapping portion includes one or more parity bits, receive an update for the same data set, update the first mapping portion and the second mapping portion based on the update, where the second mapping portion is updated non-concurrently to updating the first mapping portion, and where the updating includes flipping a parity bit of the one or more parity bits, and determine whether the one or more parity bits of the first mapping portion matches the one or more parity bits of the second mapping portion.

In one embodiment, a data storage device includes a memory device and a controller coupled to the memory device. The controller is configured to generate a first mapping portion and a second mapping portion, where the first mapping portion and the second mapping portion correspond to a same data set, and where the first mapping portion and the second mapping portion includes one or more parity bits, receive an update for the same data set, and update the first mapping portion and the second mapping portion based on the update, where the second mapping portion is updated non-concurrently to updating the first mapping portion, and where the updating includes flipping a parity bit of the one or more parity bits.

In another embodiment, a data storage device includes a memory device and a controller coupled to the memory device. The controller includes an update agent configured to update a first mapping portion and a second mapping portion. The first mapping portion and the second mapping portion correspond to a same data set. The second mapping portion is updated non-concurrently to updating the first mapping portion. The updating the first mapping portion comprises flipping a parity bit of one or more parity bits of the first mapping portion. The updating the second mapping portion comprises flipping a parity bit of one or more parity bits of the first mapping portion. The controller further includes a plurality of read agents configured to determine if the one or more parity bits of the first mapping portion matches the one or more parity bits of the second mapping portion.

In another embodiment, a data storage device includes memory means and a controller coupled to the memory means. The controller is configured to maintain a first mapping portion and a second mapping portion. The first mapping portion includes a first number of first bits and a second number of second bits. The second mapping portion includes a third number of first bits and a fourth number of second bits. A bit of the second number of second bits is flipped when the first mapping portion is updated. A bit of the fourth number of second bits is flipped when the second mapping portion is updated. The controller is further configured to determine if the second bits of the first mapping portion matches the second bits of the second mapping portion, and restore the first mapping portion and the second mapping portion from the memory means when the second bits of the first mapping portion is different from the second bits of the second mapping portion.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to data storage devices, such as solid state drives (SSDs), and, more specifically, improving consistency of flash translation layer (FTL) address mapping in large capacity data storage devices. A data storage device includes a memory device and a controller coupled to the memory device. The controller is configured to generate a first mapping portion and a second mapping portion, where the first mapping portion and the second mapping portion correspond to a same data set, and where the first mapping portion and the second mapping portion includes one or more parity bits, receive an update for the same data set, update the first mapping portion and the second mapping portion based on the update, where the second mapping portion is updated non-concurrently to updating the first mapping portion, and where the updating includes flipping a parity bit of the one or more parity bits, and determine whether the one or more parity bits of the first mapping portion matches the one or more parity bits of the second mapping portion.

Figure 1:
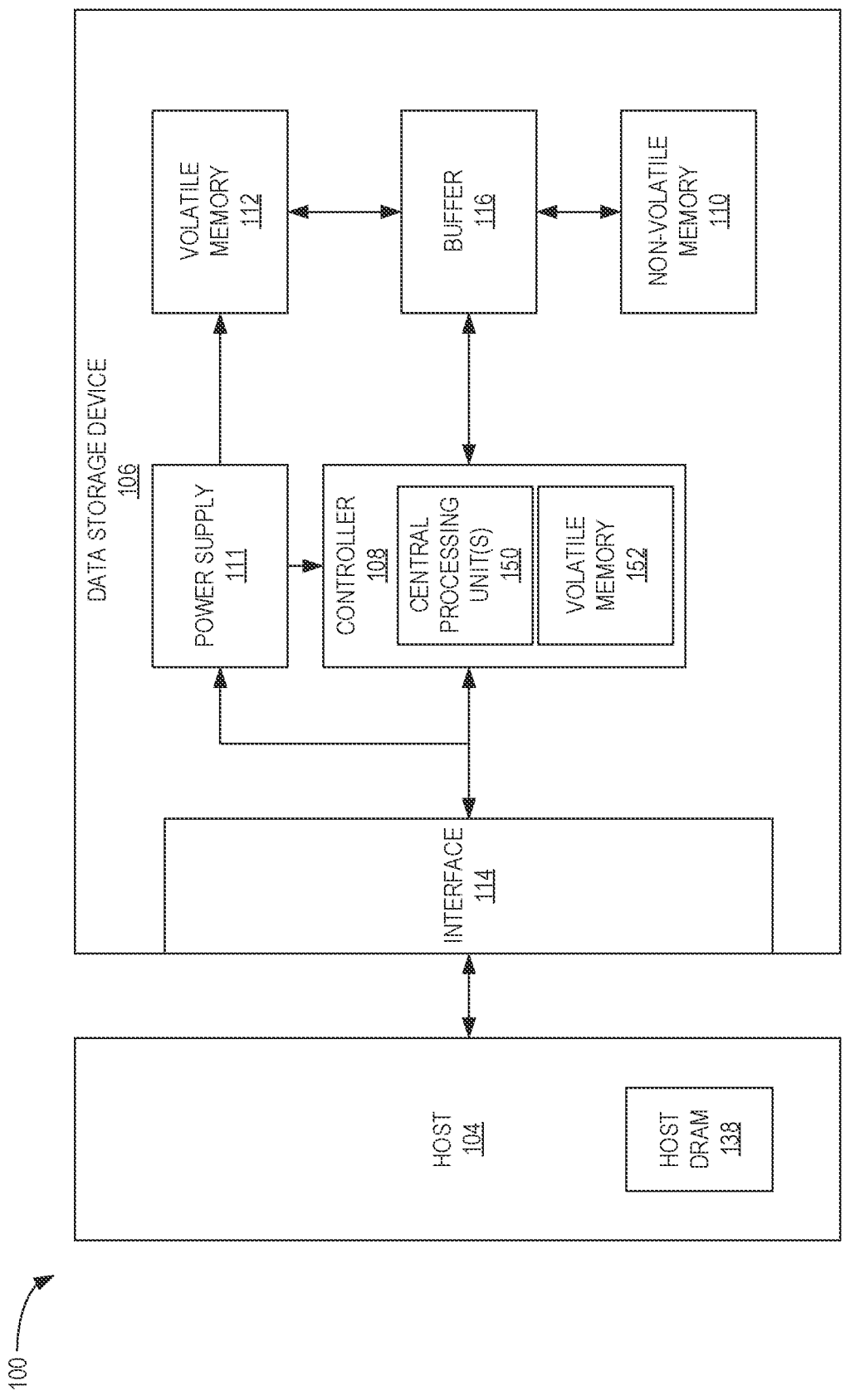
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, the interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

The controller 108 includes one or more central processing units (CPUs) 150 and a second volatile memory 152. The one or more CPUs 150 may configured to handle tasks assigned by the controller 108 such as updating tables, generating commands to read/store data from/to the NVM 110, computing operations, and the like. The second volatile memory 152 may be SRAM. The controller 108 may utilize the second volatile memory 152 as a temporary storage location to store flash translation layer (FTL) mappings logical to physical (L2P) tables, data in transit, metadata, and the like. The FTL mappings may be generated by a FTL, which may be part of the controller 108 or coupled to the controller 108. Furthermore, the host device 104 may allocate a portion of the host DRAM 138 for use by the controller 108, where the controller 108 may utilize that portion of the host DRAM 138 similarly to using the second volatile memory 152 or the volatile memory 112. The portion of the host DRAM 138 may be a host memory buffer (HMB).

Figure 2:
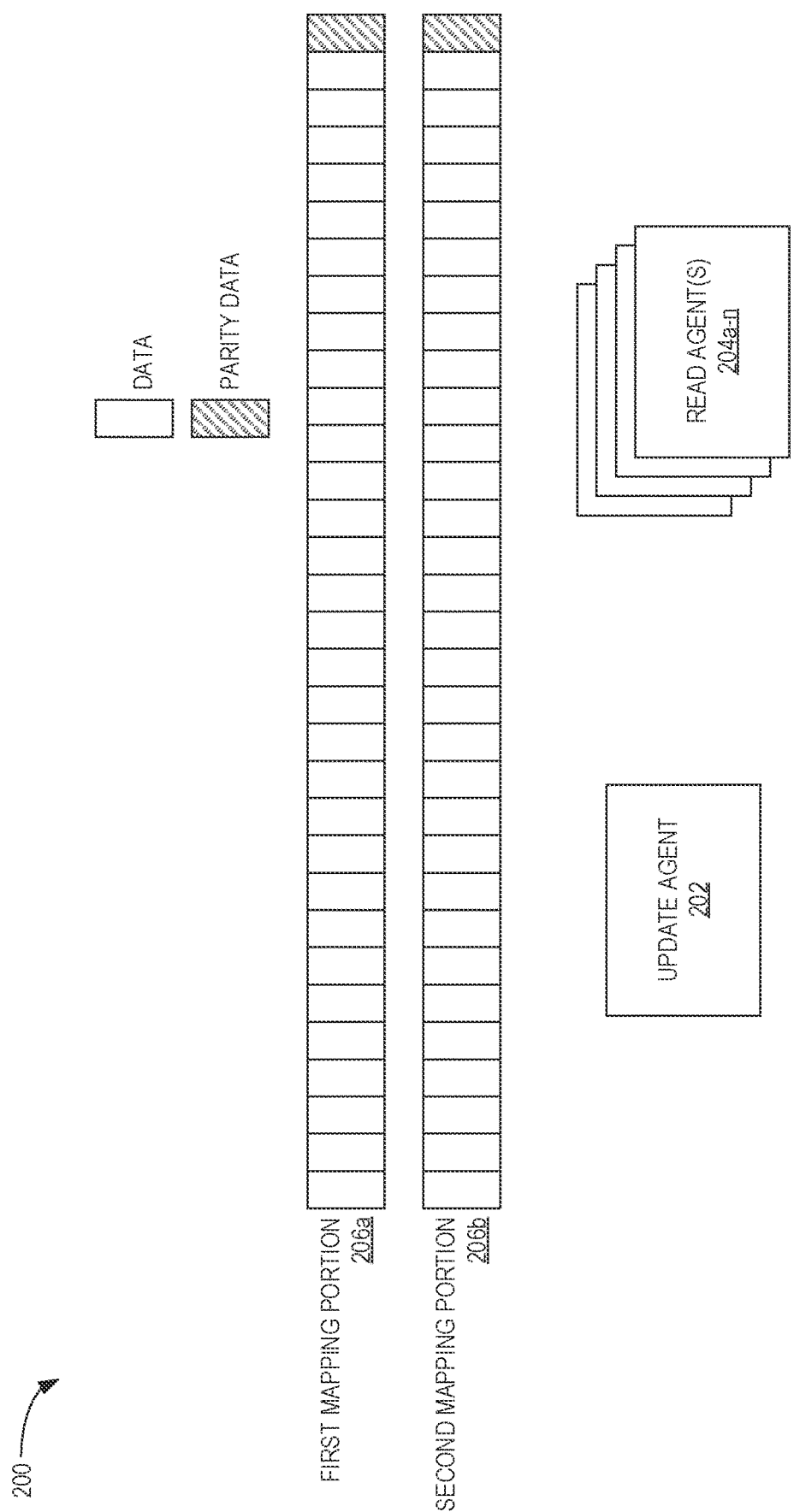
FIG. 2 is an exemplary illustration of a synchronized flash translation layer (FTL) mapping, according to certain embodiments.

FIG. 2 is an exemplary illustration of a synchronized flash translation layer (FTL) mapping 200 having a first mapping portion 206a and a second mapping portion 206b, according to certain embodiments. An update agent 202 is configured to update the first mapping portion 206a and the second mapping portion 206b. A plurality of read agents 204a-n are configured to read a mapping from the first mapping portion 206a and the second mapping portion 206b, where the first mapping portion 206a and the second mapping portion 206b are associated with a same data set. The first mapping portion 206a and the second mapping portion 206b each includes 31 bits of data and 1 parity bit. The update agent 202 and the plurality of read agents 204a-n may each be a CPU of the plurality of CPUs 150 of the controller 108 of FIG. 1. Furthermore, the first mapping portion 206a and the second mapping portion 206b may be stored in the second volatile memory 152 of FIG. 1, the volatile memory 112 of FIG. 1, or an HMB of a host device, such as the host device 104 of FIG. 1. Additionally, it is contemplated that there may be more than the first mapping portion 206a and the second mapping portion 206b for a same data set. For example, the same data set may be associated with a first mapping portion, a second mapping portion, and a third mapping portion, each having one or more parity bits, where the number of parity bits of each are equal. Therefore, the described embodiments may be applicable for examples having more than two mapping portions, such as three or greater, for the same data set.

The first mapping portion 206a and the second mapping portion 206b may each have a size of up to about 4 bytes. The first mapping portion 206a and the second mapping portion 206b each has a parity bit (indicated by the diagonally striped pattern). It is to be understood that the location of the parity bit may be in a different position than illustrated and the described embodiments are applicable to embodiments where the parity bit is in a different position than the position illustrated. The parity bits may be used to indicate whether a corresponding mapping portion has been updated. Furthermore, the first mapping portion 206a and the second mapping portion 206b may not be the same size. For example, the first mapping portion 206a may have a size of about 4 bytes (e.g., 31 bits plus 1 parity bit) and the second mapping portion 206b may have a size of about 1 byte (e.g., 7 bits plus 1 parity bit). For example, for a 512 byte sector, the 512 byte sector may include twelve 5 byte mapping units (e.g., 31 bits plus 1 parity bit) as twelve 4 byte first portions and twelve 1 byte second portions (e.g., 7 bits plus 1 parity bit). It is to be understood that more than one parity bit may exist in each mapping portion. For example, the first mapping portion 206a and the second mapping portion 206b may include 2 parity bits each.

Furthermore, when the update agent 202 updates the first mapping portion 206a and the second mapping portion 206b, the update agent 202 flips a corresponding bit of the updated mapping portion. Because the update agent 202 is only able to update a single mapping portion at a time, the one or more parity bits of the first mapping portion 206a and the second mapping portion 206b may not match. The update agent 202 will update either the first mapping portion 206a or the second mapping portion 206b and then update the other mapping portion that is not updated. In other words, any mapping portions that are related (e.g., the first mapping portion 206a and the second mapping portion 206b) may not be updated simultaneously or concurrently by the update agent 202. It is to be understood that any mapping portions that are related (e.g., the first mapping portion 206a and the second mapping portion 206b) may not be updated simultaneously or concurrently by more than one update agent. However, any number of read agents of the plurality of read agents 204a-n may read the mapping portions simultaneously and/or concurrently.

Furthermore, the updating of the mapping portion may be atomic, such that the changes occurring during the updating of relevant mapping portion may not affect the updating process of the relevant mapping portion. In other words, the mapping portion will either reflect the mapping portion before the change has occurred to the relevant portion or after the change has occurred to the relevant portion, but not a mix of the previously mentioned embodiments. When the one or more parity bits of the first mapping portion 206a and the one or more parity bits of the second mapping portion 206b do not match, the mappings may be considered as "invalid" such that at least a portion of the data of the mappings is outdated. However, when the one or more parity bits of the first mapping portion 206a and the one or more parity bits of the second mapping portion 206b match, then the corresponding mapping data (i.e., mapping address) is valid.

Any related mappings (i.e., the first mapping portion 206a and the second mapping portion 206b) may be checked for consistency (i.e., determining whether the one or more parity bits of the first mapping portion 206a and the one or more parity bits of the second mapping portion 206b match) before or after an update to the related mapping.

Furthermore, the consistency check, for a related mapping (i.e., the first mapping portion 206a and the second mapping portion 206b), may occur a number of times between a start of an update and an end of the update of the related mapping. The checking may occur after a threshold period of time has elapsed. Furthermore, the updating of any related mapping may infrequent enough to ensure that the consistency check may not occur for more than one update cycle. In some cases, when the updating of any related mapping is frequent enough such that more than one update cycle is reflected in the consistency check, more than one parity bit may be used in each mapping portion of the related mappings. When a consistency check fails, such that the one or more parity bits of the first mapping portion 206a and the one or more parity bits of the second mapping portion 206b do not match, the one or more read agents of the plurality of read agents 204a-n may be configured to wait a threshold period of time before retrying the consistency check. Furthermore, after a threshold number of retries, the controller 108 may restore the related mapping portions (e.g., the first mapping portion 206a and the second mapping portion 206b) from a memory device storing the data of the mapping portions, such as the NVM 110 of FIG. 1.

Figure 3:
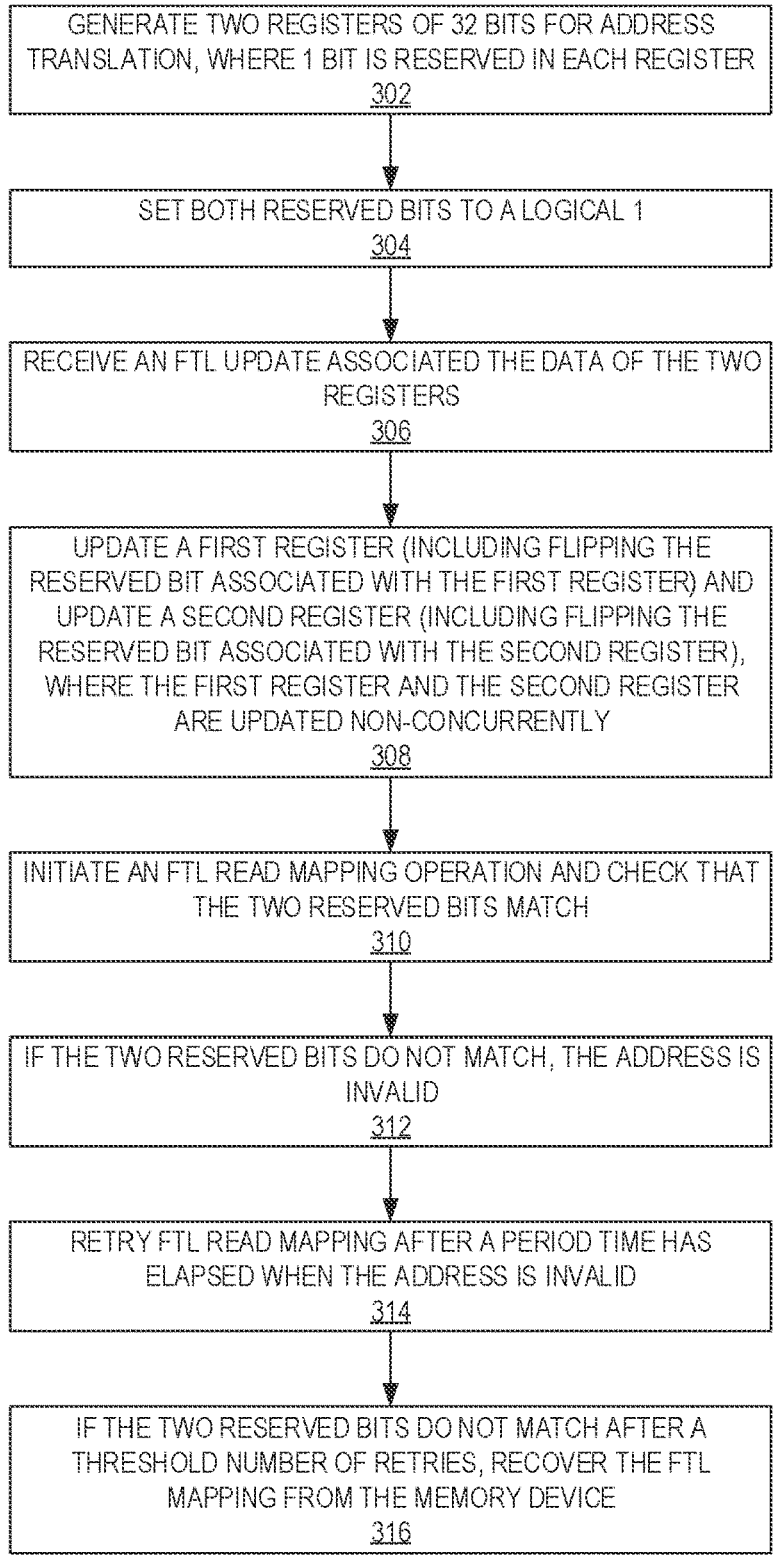
FIG. 3 is a flow diagram illustrating a method of synchronizing flash translation layer (FTL) mapping, according to certain embodiments.

FIG. 3 is a flow diagram illustrating a method 300 of synchronizing flash translation layer (FTL) mapping, according to certain embodiments. Method 300 may be implemented by a controller, such as the controller 108 of FIG. 1, where an update agent (e.g., the update agent 202 of FIG. 2) and one or more read agents of a plurality of read agents (e.g., the plurality of read agents 204a-n of FIG. 2) may be configured to update, by the update agent, and read/consistency check, by the one or more read agents of a plurality of read agents, FTL mappings, which may be the first mapping portion 206a and the second mapping portion 206b of FIG. 2. For exemplary purposes, aspects of FIG. 1 and FIG. 2 may be referenced herein.

At block 302, the controller 108 generates two registers (e.g., the first mapping portion 206a and the second mapping portion 206b) for address translation, where the two registers each have 31 bits for mapping data and 1 reserved bit. The reserved bit may be a parity bit. Furthermore, it is to be understood that the generated registers may be not be the same size, such that a first register may be 4 bytes and the second register may be 1 byte. However, each register may include the same number of reserved bits (i.e., parity bits). At block 304, the reserved bit of each register is set to 1 when the generated registers are initialized. It is to be understood that the reserved bit of each register may be set to 0 when the generated registers are initialized.

At block 306, the controller 108 receives an FTL mapping update associated with the mapping data of the generated registers. At block 308, the update agent 202 updates the first mapping portion 206a, including flipping the reserved bit of the first mapping portion 206a, and then updates the second mapping portion 206b, including flipping the reserved bit of the second mapping portion 206b. It is to be understood that in some embodiments, the second mapping portion 206b may be updated prior to the first mapping portion 206a. In other words, the mapping portion that is updated first may depend on the mapping address stored in that mapping portion. Furthermore, the updating of the mapping portions are non-concurrent and/or non-simultaneous.

At block 310, an FTL read mapping operation is initiated on the generated registers, where the FTL read mapping operation may be initiated due to a read command being received from the host device 104 or from an internal data management operation, such as garbage collection or the like. The FTL read mapping operation may be a consistency check of the generated registers. Thus, during the FTL read mapping operation, the one or more read agents of the plurality of read agents 204a-n checks each register (i.e., mapping portion) and determines whether the reserved bit (i.e., parity bit) of each register matches.

At block 312, the one or more read agents of the plurality of read agents 204a-n determines mapping addresses of the generated registers are invalid due to the reserved bit (i.e., parity bit) of each register not matching. At block 314, the one or more read agents of the plurality of read agents 204a-n re-checks, when the mapping address was previously found invalid, each register (i.e., mapping portion) after a threshold period of time has elapsed and determines whether the reserved bit (i.e., parity bit) of each register matches. At block 316, if the reserved bit of each register do not match after a threshold number of retries, the FTL mapping (i.e., the mapping portions) are recovered from the NVM 110. For example, the recovery operation may include reading from the NVM 110 and updating the generated registers based on the data read from the NVM 110 and/or reading a last stored, such as a backup, FTL mapping from the NVM 110.

By providing a first mapping portion and a second mapping portion for a same data set in large capacity data storage devices, consistency of FTL address mapping may be improved.

In one embodiment, a data storage device includes a memory device and a controller coupled to the memory device. The controller is configured to generate a first mapping portion and a second mapping portion, where the first mapping portion and the second mapping portion correspond to a same data set, and where the first mapping portion and the second mapping portion includes one or more parity bits, receive an update for the same data set, and update the first mapping portion and the second mapping portion based on the update, where the second mapping portion is updated non-concurrently to updating the first mapping portion, and where the updating includes flipping a parity bit of the one or more parity bits.

Flipping the parity bit indicates that a corresponding mapping portion is updated. The controller is further configured to determine whether the one or more parity bits of the first mapping portion matches the one or more parity bits of the second portion. The controller is further configured to determine that the same data set is valid when the one or more parity bits of the first mapping portion matches the one or more parity bits of the second portion. The controller is further configured to utilize, for read translation when the same data set is valid, either the first mapping portion, the second mapping portion, or both the first mapping portion and the second mapping portion. The controller is further configured to determine that the same data set is invalid when the one or more parity bits of the first mapping portion is different from the one or more parity bits of the second portion. The controller is further configured to retry, one or more times, determining whether the one or more parity bits of the first mapping portion matches the one or more parity bits of the second portion. The controller is further configured to restore the first mapping portion and the second mapping portion from the memory device when the retrying occurs for greater than a threshold number of times. The controller is further configured to restore the first mapping portion and the second mapping portion from the memory device are determined as invalid for greater than threshold period of time. The first mapping portion and the second mapping portion are stored in volatile memory.

In another embodiment, a data storage device includes a memory device and a controller coupled to the memory device. The controller includes an update agent configured to update a first mapping portion and a second mapping portion. The first mapping portion and the second mapping portion correspond to a same data set. The second mapping portion is updated non-concurrently to updating the first mapping portion. The updating the first mapping portion comprises flipping a parity bit of one or more parity bits of the first mapping portion. The updating the second mapping portion comprises flipping a parity bit of one or more parity bits of the first mapping portion. The controller further includes a plurality of read agents configured to determine if the one or more parity bits of the first mapping portion matches the one or more parity bits of the second mapping portion.

The update agent and the plurality of read agents are central processing units (CPUs). The one or more parity bits of the first mapping portion and the one or more parity bits of the second mapping portion are reserved bits to indicate that an update has occurred. The determining comprises reading the first mapping portion by a first read agent of the plurality of read agents and reading the second mapping portion by either the first read agent of the plurality of read agents or a second read agent of the plurality of read agents. The first mapping portion and the second mapping portion are read in parallel when the second mapping portion is read by the second read agent of the plurality of read agents. Flipping the parity bit of the one or more parity bits occurs either prior to updating a corresponding mapping portion or after updating the corresponding mapping portion. The first mapping portion and the second mapping portion are different sizes, and wherein the first mapping portion and the second mapping portion has a same number of parity bits.

In another embodiment, a data storage device includes memory means and a controller coupled to the memory means. The controller is configured to maintain a first mapping portion and a second mapping portion. The first mapping portion includes a first number of first bits and a second number of second bits. The second mapping portion includes a third number of first bits and a fourth number of second bits. A bit of the second number of second bits is flipped when the first mapping portion is updated. A bit of the fourth number of second bits is flipped when the second mapping portion is updated. The controller is further configured to determine if the second bits of the first mapping portion matches the second bits of the second mapping portion, and restore the first mapping portion and the second mapping portion from the memory means when the second bits of the first mapping portion is different from the second bits of the second mapping portion.

The restoring occurs either when a threshold period of time has elapsed that the second bits of the first mapping portion is different from the second bits of the second mapping portion or when a threshold number of retries has occurred. The controller is further configured to retry the determining when the second bits of the first mapping portion is different from the second bits of the second mapping portion. The second number of second bits and the fourth number of second bits are the same.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a memory device; and
a controller coupled to the memory device, wherein the controller is configured to:
generate a first mapping portion and a second mapping portion, wherein the first mapping portion and the second mapping portion correspond to a same data set, and wherein the first mapping portion and the second mapping portion includes one or more parity bits;

receive an update for the same data set; and update the first mapping portion and the second mapping portion based on the update, wherein the second mapping portion is updated non-concurrently to updating the first mapping portion, and wherein the updating comprises flipping a parity bit of the one or more parity bits.

2. The data storage device of claim 1, wherein flipping the parity bit indicates that a corresponding mapping portion is updated.

3. The data storage device of claim 1, wherein the controller is further configured to determine whether the one or more parity bits of the first mapping portion matches the one or more parity bits of the second portion.

4. The data storage device of claim 3, wherein the controller is further configured to determine that the same data set is valid when the one or more parity bits of the first mapping portion matches the one or more parity bits of the second portion.

5. The data storage device of claim 4, wherein the controller is further configured to utilize, for read translation when the same data set is valid, either:
the first mapping portion;
the second mapping portion; or
both the first mapping portion and the second mapping portion.

6. The data storage device of claim 3, wherein the controller is further configured to determine that the same data set is invalid when the one or more parity bits of the first mapping portion is different from the one or more parity bits of the second portion.

7. The data storage device of claim 6, wherein the controller is further configured to retry, one or more times, determining whether the one or more parity bits of the first mapping portion matches the one or more parity bits of the second portion.

8. The data storage device of claim 7, wherein the controller is further configured to restore the first mapping portion and the second mapping portion from the memory device when the retrying occurs for greater than a threshold number of times.

9. The data storage device of claim 7, wherein the controller is further configured to restore the first mapping portion and the second mapping portion from the memory device are determined as invalid for greater than threshold period of time.

10. The data storage device of claim 1, wherein the first mapping portion and the second mapping portion are stored in volatile memory.

11. A data storage device, comprising:
a memory device; and
a controller coupled to the memory device, wherein the controller comprises:
an update agent configured to update a first mapping portion and a second mapping portion, wherein:
the first mapping portion and the second mapping portion correspond to a same data set;
the second mapping portion is updated non-concurrently to updating the first mapping portion;
the updating the first mapping portion comprises flipping a parity bit of one or more parity bits of the first mapping portion; and
the updating the second mapping portion comprises flipping a parity bit of one or more parity bits of the first mapping portion; and
a plurality of read agents configured to determine if the one or more parity bits of the first mapping portion matches the one or more parity bits of the second mapping portion.

12. The data storage device of claim 11, wherein the update agent and the plurality of read agents are central processing units (CPUs).

13. The data storage device of claim 11, wherein the one or more parity bits of the first mapping portion and the one or more parity bits of the second mapping portion are reserved bits to indicate that an update has occurred.

14. The data storage device of claim 11, wherein the determining comprises reading the first mapping portion by a first read agent of the plurality of read agents and reading the second mapping portion by either:
the first read agent of the plurality of read agents; or
a second read agent of the plurality of read agents.

15. The data storage device of claim 14, wherein the first mapping portion and the second mapping portion are read in parallel when the second mapping portion is read by the second read agent of the plurality of read agents.

16. The data storage device of claim 11, wherein flipping the parity bit of the one or more parity bits occurs either:
prior to updating a corresponding mapping portion; or
after updating the corresponding mapping portion.

17. The data storage device of claim 11, wherein the first mapping portion and the second mapping portion are different sizes, and wherein the first mapping portion and the second mapping portion has a same number of parity bits.

18. A data storage device, comprising:
memory means; and
a controller coupled to the memory means, wherein the controller is configured to:
maintain a first mapping portion and a second mapping portion, wherein:
the first mapping portion includes a first number of first bits and a second number of second bits;
the second mapping portion includes a third number of first bits and a fourth number of second bits;
a bit of the second number of second bits is flipped when the first mapping portion is updated; and
a bit of the fourth number of second bits is flipped when the second mapping portion is updated;
determine if the second bits of the first mapping portion matches the second bits of the second mapping portion; and
restore the first mapping portion and the second mapping portion from the memory means when the second bits of the first mapping portion is different from the second bits of the second mapping portion.

19. The data storage device of claim 18, wherein the restoring occurs either:
when a threshold period of time has elapsed that the second bits of the first mapping portion is different from the second bits of the second mapping portion; or
when a threshold number of retries has occurred, wherein the controller is further configured to retry the determining when the second bits of the first mapping portion is different from the second bits of the second mapping portion.

20. The data storage device of claim 18, wherein the second number of second bits and the fourth number of second bits are the same.

* * * * *